United States Patent
Key et al.

(10) Patent No.: US 8,180,966 B2
(45) Date of Patent: May 15, 2012

(54) SYSTEM AND METHOD FOR OPERATING A PACKET BUFFER IN AN INTERMEDIATE NODE

(75) Inventors: Kenneth M. Key, Raleigh, NC (US); Kwok Ken Mak, Chapel Hill, NC (US); Xiaoming Sun, Chapel Hill, NC (US)

(73) Assignee: Cisco Technology, Inc., San Jose, CA (US)

( * ) Notice: Subject to any disclaimer, the term of this patent is extended or adjusted under 35 U.S.C. 154(b) by 725 days.

(21) Appl. No.: 11/090,734

(22) Filed: Mar. 25, 2005

(65) Prior Publication Data

US 2005/0169291 A1 Aug. 4, 2005

Related U.S. Application Data

(62) Division of application No. 10/135,603, filed on Apr. 30, 2002, now Pat. No. 6,892,285.

(51) Int. Cl.
*G06F 12/02* (2006.01)
(52) U.S. Cl. ........ 711/129; 711/118; 711/165; 711/170; 711/173
(58) Field of Classification Search .................. None
See application file for complete search history.

(56) References Cited

U.S. PATENT DOCUMENTS

| | | | |
|---|---|---|---|
| 4,374,428 A * | 2/1983 | Barnes | 711/100 |
| 5,091,850 A * | 2/1992 | Culley | 711/3 |
| 5,398,245 A | 3/1995 | Harriman, Jr. | |
| 5,502,833 A * | 3/1996 | Byrn et al. | 711/132 |
| 5,651,002 A | 7/1997 | Van Seters et al. | |
| 6,009,472 A | 12/1999 | Boudou et al. | |
| 6,078,532 A | 6/2000 | Rivers et al. | |
| 6,091,725 A | 7/2000 | Cheriton et al. | |
| 6,147,996 A | 11/2000 | Laor et al. | |
| 6,201,729 B1 | 3/2001 | Rivers | |
| 6,205,150 B1 * | 3/2001 | Ruszczyk | 370/412 |
| 6,230,241 B1 | 5/2001 | McKenney | |
| 6,236,658 B1 | 5/2001 | Essbaum et al. | |
| 6,240,461 B1 | 5/2001 | Cieslak et al. | |
| 6,437,789 B1 * | 8/2002 | Tidwell et al. | 345/557 |
| 7,028,299 B1 * | 4/2006 | Chang | 718/104 |
| 2001/0038607 A1 * | 11/2001 | Honda | 370/218 |
| 2004/0037276 A1 | 2/2004 | Henderson et al. | |

OTHER PUBLICATIONS

U.S. Appl. No. 10/135,495, filed Apr. 2002, Prasad.
Iyer, S. et al., "Analysis of a Memory Architecture for Fast Packing Buffers", 2001, IEEE Workshop on High Performance Switching and Routing, May 29-31, 2001, pp. 368-373.

* cited by examiner

*Primary Examiner* — Jae Yu
(74) *Attorney, Agent, or Firm* — Cesari and McKenna, LLP (57) ABSTRACT

A technique implements a novel high-speed high-density packet buffer utilizing a combination of high-speed and low-speed memory devices. The novel packet buffer is organized as a plurality of FIFO queues where each FIFO queue is associated with a particular input or output line. Each queue comprises a high-speed cache portion that resides in high-speed memory and a low-speed high-density portion that resides in low-speed high-density memory. The high-speed cache portion contains FIFO data that contains head and/or tail associated with the novel FIFO queue. The low-speed high-density portion contains FIFO data that is not contained in the high-speed cache portion.

21 Claims, 9 Drawing Sheets

SYSTEM AND METHOD FOR OPERATING A PACKET BUFFER IN AN INTERMEDIATE NODE

CROSS-REFERENCE TO RELATED APPLICATIONS

The present invention is related to the following co-pending and commonly assigned U.S. patent application Ser. No. 10/135,495 titled, Queue Cache, which was filed on even date.

The present Application is a Divisional of application Ser. No. 10/135,603 filed Apr. 30, 2002, now issued as U. S. Patent No. 6,892,285 on May 10,2005.

BACKGROUND OF THE INVENTION

1. Field of the Invention

The invention relates generally to networking devices and more specifically to caching data contained in packet buffers.

2. Background Information

A computer network is a geographically distributed collection of interconnected communication links for transporting data between nodes, such as computers. Many types of computer networks are available, with the types ranging from local area networks (LANs) to wide area networks (WANs). The nodes typically communicate by exchanging discrete frames or packets of data according to pre-defined protocols, such as the Transmission Control Protocol/Internet Protocol (TCP/IP) or the Internetwork Packet eXchange (IPX) protocol.

The topology of a computer network can vary greatly. For example, the topology may comprise a single LAN containing a single intermediate node of a type such as, e.g., a hub, with end-nodes attached to the hub. A more complex network may contain one or more local area networks interconnected through a complex intermediate internetwork comprising a plurality of other types of intermediate nodes, such as switches or routers, to form a WAN. Each of these latter intermediate nodes typically contain a central processor that enables the intermediate node to, inter alia, route or switch the packets of data along the interconnected links from, e.g., a source end-node that originates the data to a destination end-node that is designated to receive the data. Often, these intermediate nodes employ packet buffers to temporarily hold packets that are processed by the nodes.

Packet buffers often comprise one or more memory devices that are arranged to form one or more First-In First-Out (FIFO) queues where each queue is associated with a particular input or output line. The size of each FIFO queue often depends on the rate of the line associated with the queue, as well as the time it takes for a packet to be processed by the intermediate node. For example, assume an input line on an intermediate node has a line rate of 1 Gigabits per second (Gb/s) and a packet takes 250 milliseconds (ms) to be processed by the node. The FIFO queue size can be determined by multiplying the line rate times the processing rate, thus yielding a queue size of at least 250 megabits (Mb).

The line rates associated with the input or output lines typically define the minimum required memory bandwidth of the packet buffer needed to support those lines. Memory bandwidth is often determined by taking the reciprocal of the "random cycle time" (tRC) associated with the memory devices that comprise the packet buffer and multiplying this result by the number of bits that can be transferred to the memory devices at a time. For example, assume a packet buffer can handle 64-bit data transfers and the memory devices that comprise the buffer have a tRC of 50 nanoseconds (ns), the memory bandwidth for the packet buffer is 1.2 Gb/s.

A typical intermediate node may comprise many line cards where each line card contains many ports and each port comprises an input line and an output line. Moreover, each line may operate at a rate of 1 Gb/s or greater. Thus, packet buffers for intermediate nodes are often large and operate at a very-high memory bandwidth. For example, assume an intermediate node has four ports with two lines per port and each line operates at a rate of 1 Gb/s. Further assume the intermediate node can process a packet in 250 ms and that data is transferred to and from the packet buffer using 64-bit data transfers. The memory bandwidth for the packet buffer must be at least 8 Gb/s and the tRC for the memory devices must be 8 ns or less. Moreover, the size of each FIFO must be at least 250 Mb yielding an overall packet buffer size of 1 gigabit (Gb).

In order to meet the high-bandwidth requirements associated with high-speed data communication lines, conventional packet buffer design mandates use of solely high-speed memory devices, such as Static Random Access Memory (SRAM), because their bandwidth and tRC is often sufficient to meet the rigorous requirements demanded by high speed input/output lines. However, high-speed memory devices are often very costly and not sufficiently dense to make them practical to be used for such an implementation.

An alternative technique for implementing a high-speed high-density packet buffer has been described in S. Iyer et al., Analysis of a Memory Architecture for Fast Packet Buffers, IEEE Workshop on High Performance Switching and Routing, IEEE, May 2001, pp. 368-373. This technique employs a combination of high speed devices arranged as a head and tail cache and low-speed high-density devices, such as Dynamic Random Access Memory (DRAM), arranged to hold the FIFO queues. Moreover, the technique employs a memory management algorithm that utilizes a look-ahead arrangement to determine the order data is read from the low-speed devices to replenish the head cache. However, the technique does not scale well with respect to the number of FIFO queues and consequently may be inapplicable in systems that contain a large number of queues, e.g., greater than 512. It would be desirable to have a technique for implementing a high-speed high-density packet buffer that scales well to systems that employ a large number of queues.

SUMMARY OF THE INVENTION

The present invention incorporates a technique that enables implementation of a high-speed, high-density packet buffer utilizing a combination of high-speed and low-speed memory devices in addition to a cache replenishment technique that enables support of a large number of queues. The novel packet buffer is organized as a plurality of FIFO queues where each FIFO queue is associated with a particular input or output line. Each queue comprises a high-speed cache portion that resides in high-speed memory and a low-speed, high-density portion that resides in low-speed, high-density memory. The high-speed cache portion holds FIFO data associated with the head and/or tail of the novel FIFO queue. The low-speed, high-density portion holds FIFO data that is not held in the high-speed cache portion.

Each FIFO queue is associated with a directory entry that holds information specific to the queue. This information includes head and tail information associated with the queue as well as information relating to the amount of data contained in the high-speed portion of the FIFO. The information contained in the directory is used to determine, inter alia, when and how to replenish the high-speed portion of the FIFO queue.

In one embodiment of the invention, the high-speed portion of the FIFO queue holds only data associated with the head of the queue. Data written to the tail of the queue is written to the low-speed portion of the queue. Data is read from either the head cache, if data is available there, or the low-speed portion if the head cache is depleted. The head cache is refilled, as necessary, whenever data is written from or read to the FIFO queue.

Advantageously, the inventive technique enables high-speed, high-density packet buffers to be implemented without relying wholly on high-speed memory devices. Rather, according to the invention, a portion of the high-speed, high-density packet buffer can be implemented using inexpensive low-speed, high-density devices, such as commodity DRAMs.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN
ILLUSTRATIVE EMBODIMENT

Figure 1:
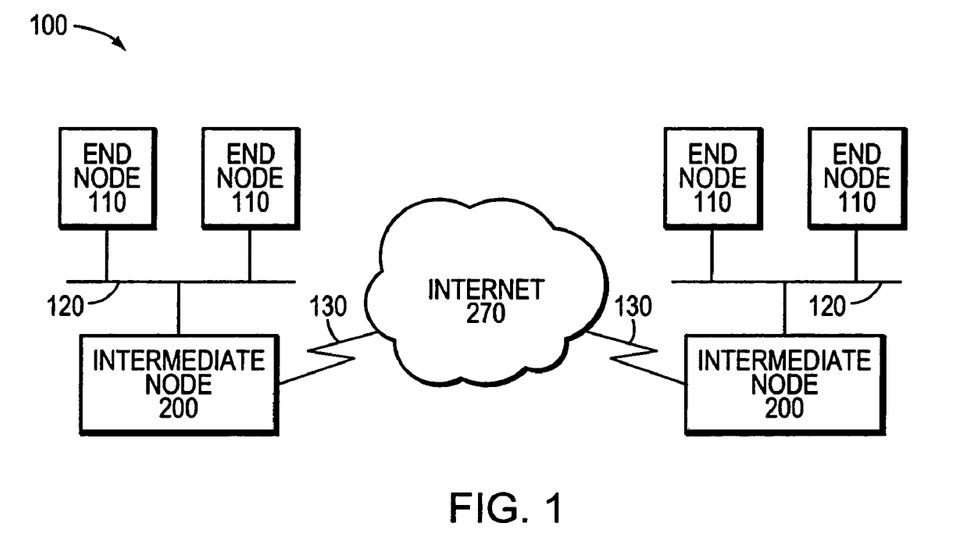
FIG. 1 is a schematic block diagram of a network that can be advantageously used with the present invention.

FIG. 1 is a schematic block diagram of a computer network 100 that can be advantageously used with the present invention. The computer network 100 comprises a collection of communication links and segments connected to a plurality of nodes, such as end nodes 110 and intermediate nodes 200. The network links and segments may comprise local area networks (LANs) 120, wide area networks (WANs) such as Internet 270 and WAN links 130 interconnected by intermediate nodes 200, such as network switches or routers, to form an internetwork of computer nodes. These internetworked nodes communicate by exchanging data packets according to a predefined set of protocols, such as the Transmission Control Protocol/Internet Protocol (TCP/IP) and the Internetwork Packet eXchange (IPX) protocol.

Figure 2:
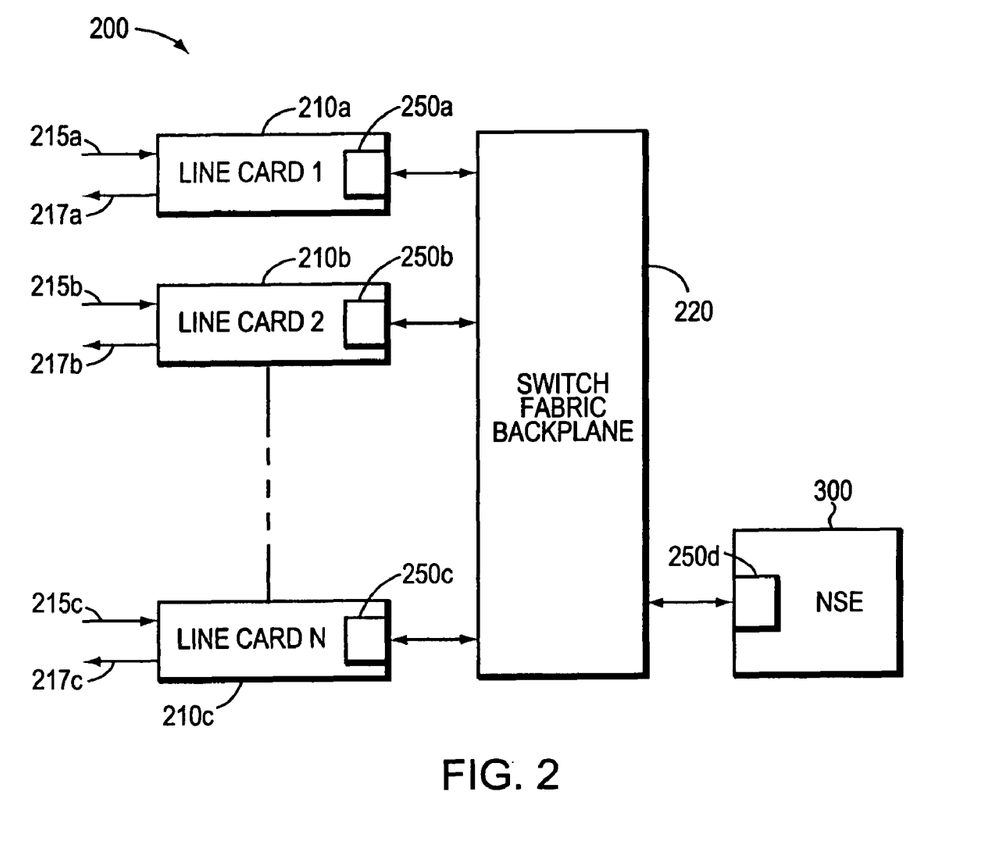
FIG. 2 is a partial schematic block diagram of an intermediate node that can be advantageously used with the present invention.

FIG. 2 is a partial block diagram of an intermediate node (switch) 200 that can be advantageously used with the present invention. An illustrative example of intermediate node 200 is the Cisco 7300 Router available from Cisco Systems, Incorporated, San Jose, Calif. The illustrative intermediate node 200 is a compact, mid-range router that provides high availability and high performance and delivers high-touch IP services at optical speeds. Intermediate node 200 supports various combinations of communication protocols including, e.g., Asynchronous Transmission Mode (ATM), Ethernet, Fast Ethernet, Gigabit Ethernet and multi-channel T3. The intermediate node 200 comprises a plurality of cards including line cards 210 and a network services engine (NSE) card 300 interconnected by a switch fabric backplane 220. Moreover, each card has a backplane interface 250 that, inter alia, interfaces the card to the backplane 220 and enables the card to send and receive various data and control signals to and from the backplane 220.

The line cards 210 connect (interface) the intermediate node, which may alternatively be configured as a switch 200, with the network 100. To that end, the line cards 210 receive and transmit data over the network through input ports 215 and output ports 217, respectively, using various protocols such as, e.g., OC-3, OC-12, Fast Ethernet, T3. The line cards 210 forward data received from the network 100 to the backplane 220, as well as transmit data received from the backplane 220 to the network 100.

The switch fabric backplane 220 comprises logic and a point-to-point interconnection backplane that provides an interface between the line cards 210 and the NSE 300. That is, the backplane 220 provides interconnections between the cards that allow data and signals to be transferred from one card to another.

Figure 3:
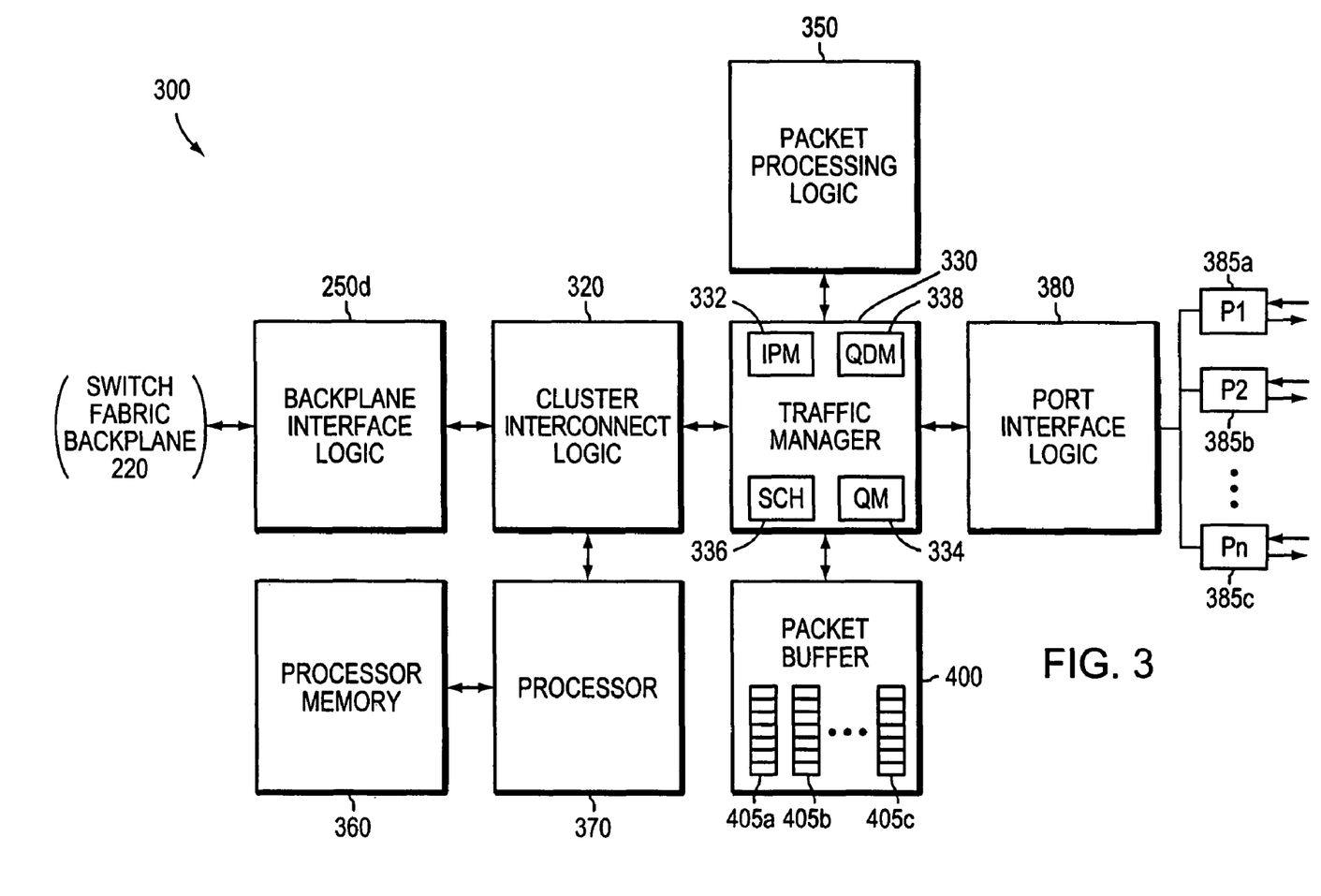
FIG. 3 is a partial schematic block diagram of a network services engine (NSE) that can be used to implement the present invention.

The NSE 300 is adapted to provide processing of incoming and outgoing packets. FIG. 3 is a partial block diagram of NSE 300 comprising backplane interface logic 250d, cluster interconnect logic 320, processor 370, processor memory 360, packet processing logic 350, port interface logic 380, one or more physical ports 385, traffic manager 330 and packet buffer 400. The backplane interface logic 250d comprises logic that enables NSE 300 to communicate over the backplane 220. For example, the backplane interface logic 250d comprises logic that enables the NSE 300 to communicate with other cards connected to the backplane 220 using various data and control signals.

The cluster interconnect logic 320 comprises logic that interfaces the backplane interface logic 250d and the processor 370 with the traffic manager 330. Preferably, the cluster interconnect is embodied in a Field Programmable Gate Array (FPGA) that is configured to enable the traffic manager 330 to transmit and receive data to and from the backplane 220 and the processor 370.

The processor 370 comprises processing elements and logic that are capable of executing instructions and generating memory requests. An example of processor 370 that may be advantageously used with the invention is the BCM1250 processor available from Broadcom Corporation, Irving, Calif. The processor memory 360 is a computer readable medium that holds data and software routines containing executable instructions. These data and software routines enable (adapt) the processor 370 to perform various functions, such as managing switch 200, as well as route processing. The processor memory 360 may comprise one or more memory devices (not shown) that are capable of storing executable instructions and data. Preferably, these memory devices are industry standard memory devices, such as Dynamic Random Access Memory (DRAM) devices available from Micron Technology, Inc., Boise, Id.

The port interface logic 380 comprises logic that interfaces the traffic manager 330 to the physical ports 385. To that end, the port interface logic 380 includes logic that enables the traffic manager 330 to transmit and receive packets to and from the ports 385, respectively. The ports 385 comprise logic that physically interfaces the NSE 300 to the network 100.

The packet processing logic 350 comprises logic and processing elements that, inter alia, classify a packet that has been received by NSE 300. The packet processing logic 350 includes logic that is configured to examine packet headers of received packets and associate each packet with a FIFO queue contained in the packet buffer 400. Preferably, the packet processing logic 350 is embodied in a series of Application Specific Integrated Circuits (ASICs).

The traffic manager 330 comprises logic and memory elements that are configured to, inter alia, enqueue and dequeue packets to and from FIFO queues 405 contained in the packet buffer 400. Moreover, the traffic manager 330 is configured to allocate and deallocate blocks of memory contained in the packet buffer's external DRAM and issue commands to the packet buffer 400 to direct that buffer 400 to write and read packets to and from the FIFO queues 405. To that end, traffic manager 330 includes an internal packet memory (IPM) 332, a queue descriptor memory (QDM) 338, a scheduler (SCH) 336 and a queue manager (QM) 334. The internal packet memory 332 contains logic and memory elements that are used to temporarily hold packets received from the switch fabric backplane 220 and the physical ports 385. The queue descriptor memory 338 holds information specific to each of the queues 405. This information includes pointers to the head and tail of each queue 405, as well as the size of each queue. The scheduler 336 contains logic and processing elements that perform traffic management and shaping of traffic transmitted by the NSE 300 over the switch fabric backplane 220 and ports 385. The queue manager 334 comprises logic and processing elements that, inter alia, manage each of the FIFO queues 405 contained in the packet buffer 400. Preferably, traffic manager 330 is configured to support 8192 FIFO queues.

Packet buffer 400 comprises logic and memory elements that enable packets to be written and read to and from the FIFO queues 405 in accordance with the present invention. Each FIFO queue 405 comprises a low-speed portion 492 (FIG. 4) and a high-speed portion 482. Moreover, each queue is associated with a queue identifier (QID). Preferably, packet buffer 400 is configured to support 8192 FIFO queues.

Operationally, incoming packets are received from the network 100 by the source line cards 210 and sent over the switch fabric backplane 220 to NSE 300 where they are received by the backplane interface logic 250d and transferred through the cluster inter-connect logic 320 to the traffic manager 330 for further processing. Alternatively, packets are received from the network 100 by the physical ports 385 and transferred to the traffic manager 330 through the port interface logic 380. The traffic manager 330 stores each packet in the internal packet memory 332 and notifies the packet processing logic 350. The packet processing logic 350 examines the packet's header, selects a FIFO queue 405 that is to receive the packet and conveys the FIFO queue's QID to the queue manager 334. The queue manager 334 allocates, as necessary, one or more blocks of the DRAM 490 (FIG. 4), associates the allocated blocks with the QID and issues a series of commands to the packet buffer 400 to place the packet in the allocated DRAM. The queue manager 334 then notifies the scheduler 336 to schedule the packet for dequeuing. When the packet is to be dequeued, the scheduler 336 notifies the queue manager 334. The queue manager 334, in turn, issues a series of commands to the packet buffer 400 to dequeue the packet. The dequeued packet is then processed and sent out onto the back-plane 220 or one or more physical ports 385.

The present invention comprises a technique that enables the implementation of a high-speed, high-density packet buffer utilizing a combination of high-speed and low-speed memory devices. The novel packet buffer is organized as a plurality of FIFO queues where each FIFO queue is associated with a particular input or output line. Each queue comprises a high-speed cache portion that resides in a high-speed memory and a low-speed, high-density portion that resides in a low-speed high-density memory. The high-speed cache portion contains FIFO data associated with the head and/or the tail of the novel FIFO queue. The low-speed, high-density portion contains FIFO data that is not contained in the high-speed cache portion.

Figure 4:
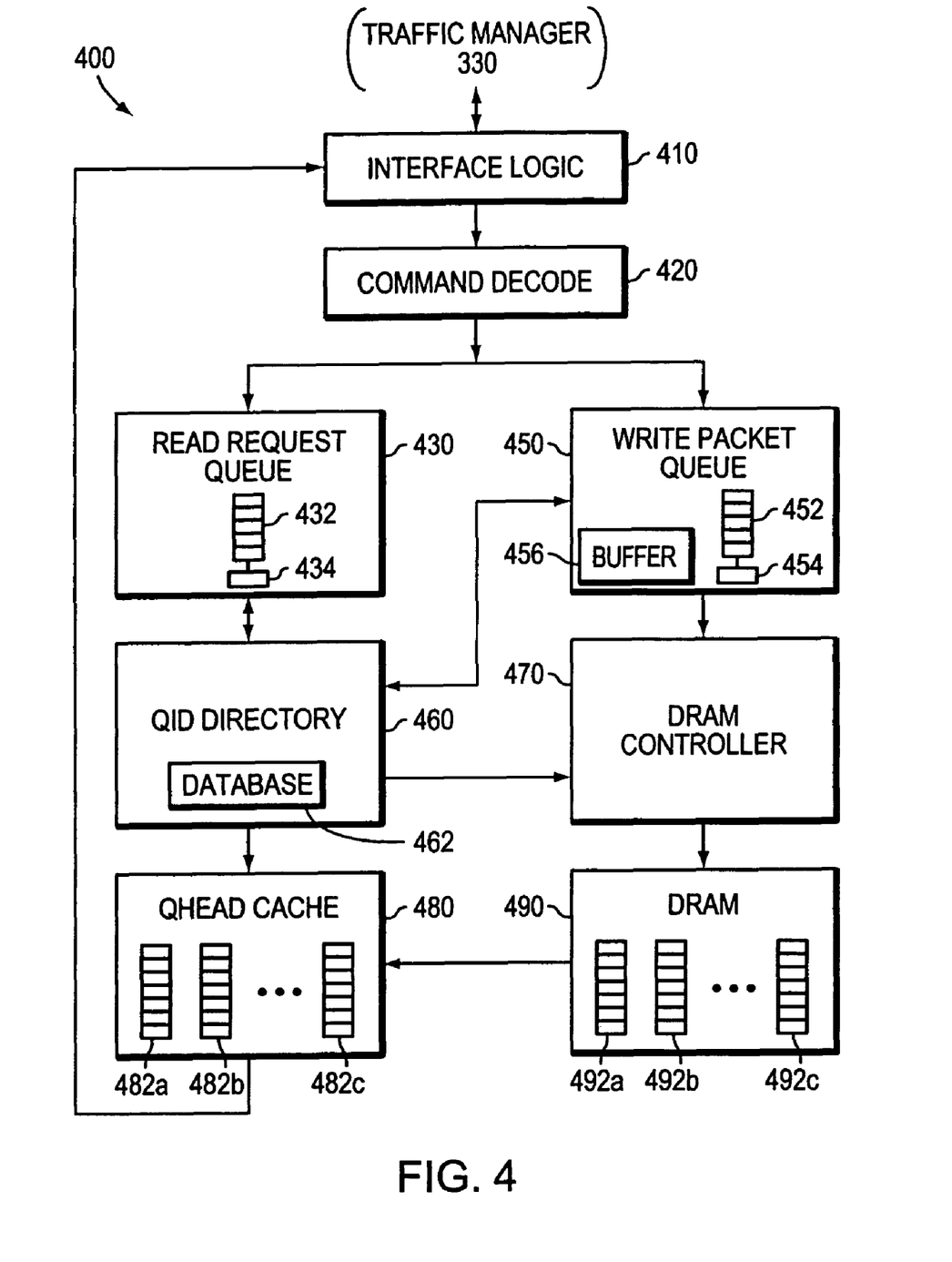
FIG. 4 is a schematic block diagram of a packet buffer that can be used to implement the present invention.

FIG. 4 is a detailed partial schematic block diagram of packet buffer 400 that can be used to implement the present invention. Packet buffer 400 comprises interface logic 410, command decode logic 420, read request queue logic 430, queue identifier (QID) directory 460, queue head (Qhead) cache 480, write packet queue logic 450, DRAM controller 470 and DRAM 490. Preferably, the interface logic 410, command decode logic 420, read request queue 430, QID directory 460, Qhead cache 480, write packet queue 450 and DRAM controller 470 are embodied in one or more ASICs.

The interface logic 410 comprises logic that is configured to interface packet buffer 400 to the traffic manager 330. To that end, the interface logic 410 generates the necessary data and control signals that enable requests and data to be transferred between the traffic manager 330 and packet buffer 400. The command decode logic 420 is connected to the interface logic 410, the read request queue logic 430 and the write packet queue logic 450, and comprises logic configured to process requests received at interface logic 410. If a read command is specified in the request, the logic 420 forwards the request to the read request queue logic 430; otherwise if a write command is specified, the logic 420 forwards the request and data to the write packet queue logic 450.

The read request queue 430 comprises logic and memory elements that are configured to hold and process read commands received by the command decode logic 420. The read request queue 430 comprises a FIFO command queue 432 and command decode logic 434 that is configured to process a command when it reaches the head of the command queue 432. Preferably, the FIFO command queue 432 is a 32-entry by 72-bit FIFO queue that is configured to hold up to 32 read requests.

Similarly, the write packet queue 450 comprises logic and memory elements that are configured to hold and process write commands and data received by the command decode logic 420. The write packet queue 450 comprises a FIFO command queue 452, command decode logic 454 that is configured to process a command when it reaches the head of the command queue 452 and a write packet buffer 456 that is configured to hold data associated with the commands in the command queue 452. Preferably, the command queue 452 is a 16-entry queue that is configured to hold up to 16 write requests.

DRAM controller 470 comprises logic that is configured to process requests issued by the write packet queue 450 and QID directory logic 460. To that end, the DRAM controller 470 contains logic that decodes requests and transfers data associated with those requests, preferably as 32-byte blocks, to and from the low-speed portion 492 of the FIFO queues 405 contained in DRAM 490.

DRAM 490 comprises logic and memory elements that are configured to hold the low-speed portion 492 of each FIFO queue 405, preferably as a series of one or more 4096-byte blocks. Preferably, the memory elements comprise high-density commodity memory devices capable of holding packet data, such as Reduced Latency DRAM (RLDRAM) devices available from Infineon Technologies Corporation, San Jose, Calif.

The Qhead cache 480 comprises logic and memory elements configured to hold the high-speed portion 482 of FIFO queue 405, which in the preferred embodiment, is the first 1024 bytes at the head of the queue. Preferably, Qhead cache 480 comprises high-speed, high-bandwidth embedded memory macros or external memory devices, such as Static Random Access Memory (SRAM) devices available from Micron Technology, Inc., Boise, Id.

The QID directory 460 comprises logic and memory elements that are configured to, inter alia, issue requests to the DRAM controller 470 and hold information specific to the FIFO queues 405. The QID directory 460 issues read requests to DRAM controller 470 to refill the Qhead cache 480 as directed by the read request queue 430 and write packet queue 450. Moreover QID directory 460 comprises a database 462 that is configured to hold information specific to the FIFO queues 405. Preferably, database 462 is organized as a series of 8192 entries where each entry is associated with a particular FIFO queue 405.

Figure 5:
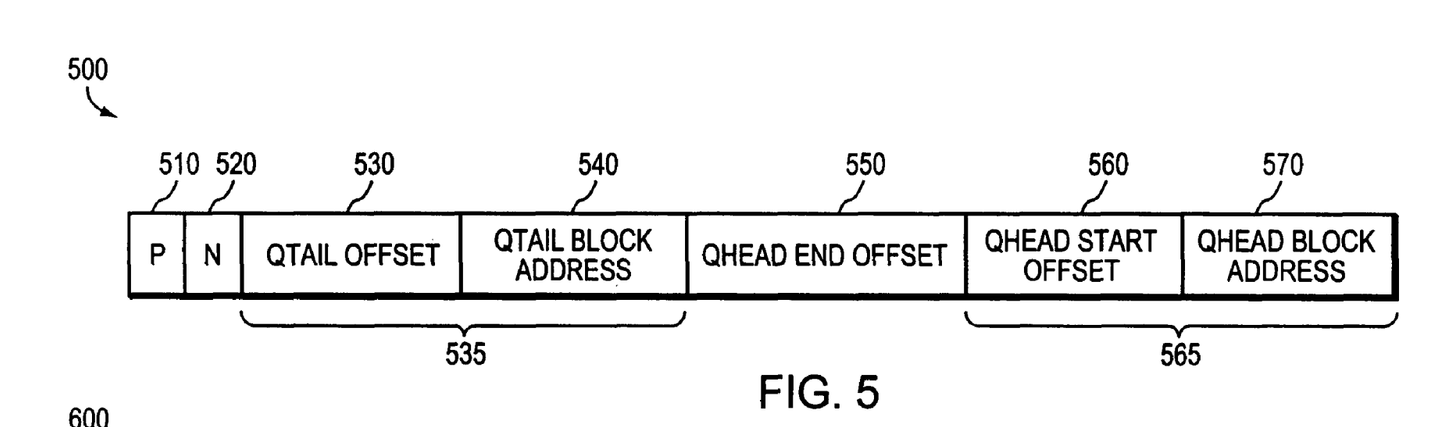
FIG. 5 is a schematic block diagram of a QID directory entry that can be used with the present invention.

FIG. 5 is a schematic diagram of a typical entry 500 contained in the QID directory database 462. Entry 500 comprises a parity field 510, a new entry field 520, a Qtail offset field 530, a Qtail block address field 540, a Qhead end offset field 550, a Qhead start offset field 560 and a Qhead block address field 570. The parity field 510 contains a one-bit value that represents the overall parity of the entry 500. The new entry field 520 comprises a one-bit flag field that indicates whether or not the queue is enqueuing data for the first time.

The Qtail block address field 540 holds a pointer which is the address of the 4096-byte block in DRAM 490 that is associated with the queue's tail and the Qtail offset field 530 holds the byte offset within the 4096-byte block "pointed to" (referenced) by the Qtail block address field 540. Together the Qtail block address 540 and Qtail offset 530 yield the queue tail pointer 535, which is a pointer to the byte address of the queue's tail.

The Qhead block address field 570 holds a pointer, which is the address of the 4096-byte block in DRAM 490 that is associated with the queue's head. The Qhead start offset field 560 holds the byte offset within the 4096-byte block "pointed to" (referenced) by the Qhead block address field 570. Collectively, the Qhead block address 570 and the Qhead start offset 560 yield the queue head pointer 565, which is a pointer to the byte address of the queue's head.

The Qhead end offset field 550 holds the byte offset of the last byte within the block pointed to by the Qhead block address field 570 that is contained in the high-speed portion 482 of the queue 405. The difference between the Qhead start offset and the Qhead end offset yields the number of bytes currently in the high-speed portion of the associated FIFO queue 405.

Suppose, for example, that traffic manager 330 needs to place (enqueue) a 2048-byte packet located in the internal packet memory 332 into FIFO queue 405a and dequeue that packet at some later time as determined by the scheduler 336. Further suppose that the packet processing logic 350 has examined the packet and provided the traffic manager 330 with a QID associated with FIFO queue 405a and that the new entry field 520 in the QID entry 500 associated with queue 405a indicates the queue is enqueuing data for the first time.

Figure 6:
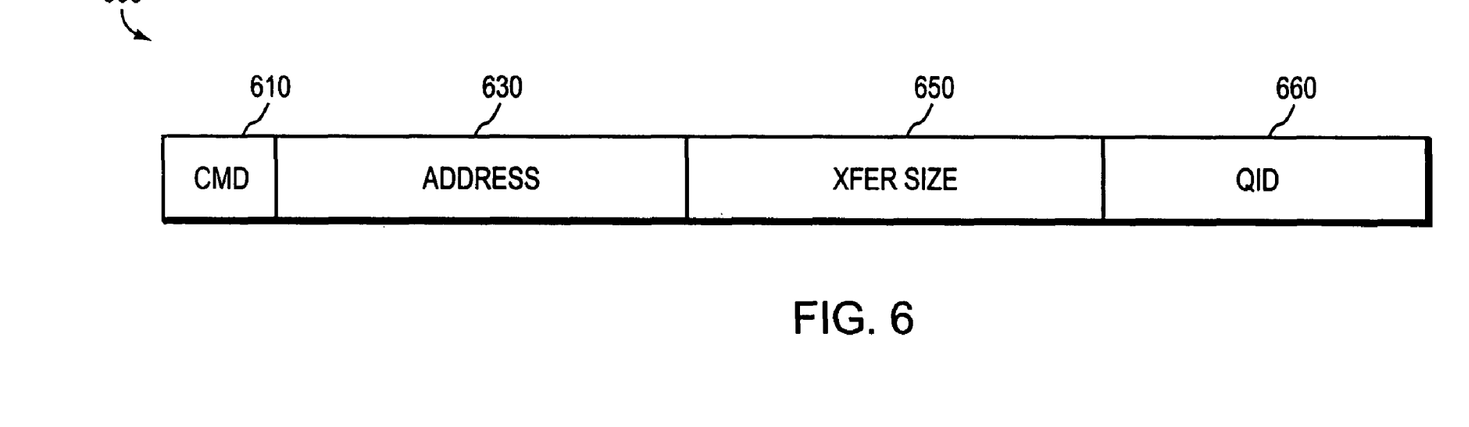
FIG. 6 is a schematic block diagram of a request that can be used with the present invention.
Figure 7:
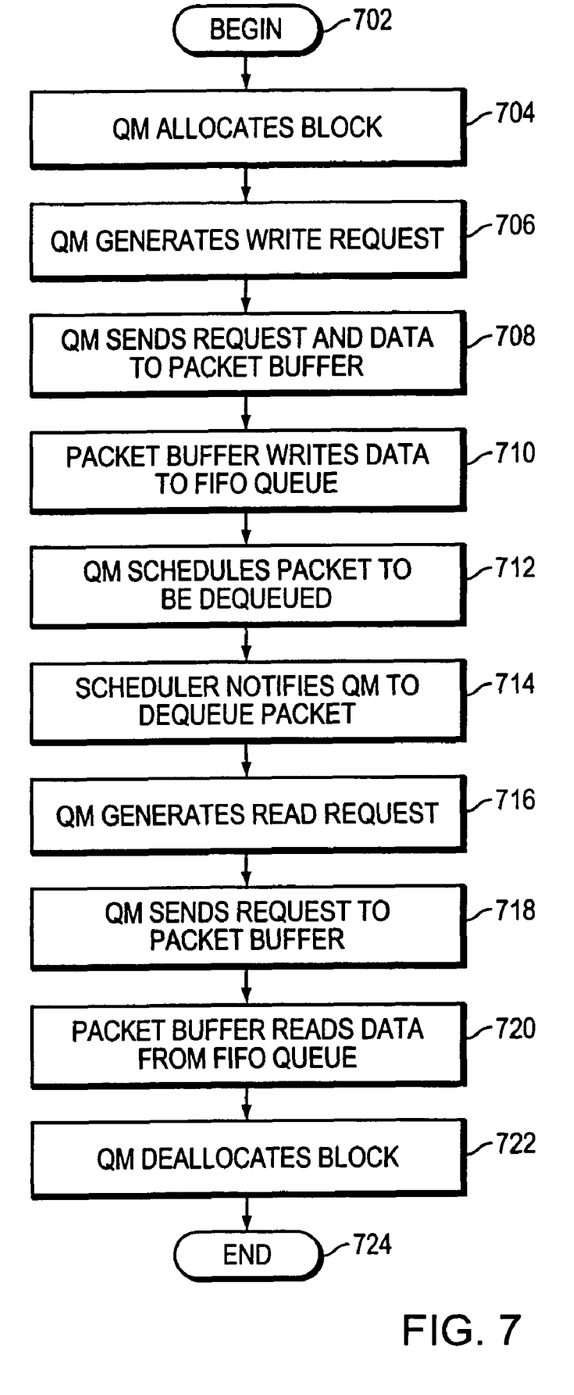
FIG. 7 is a high-level flow diagram of a method that can be used to enqueue and dequeue packets to and from a FIFO queue in accordance with the present invention.

FIG. 7 is a high-level flow diagram of a sequence of steps traffic manager 334 can use to enqueue the packet to FIFO queue 405a, schedule the packet for dequeuing and dequeue the packet. The sequence begins at Step 702 and proceeds to Step 704 where queue manager 334 allocates a 4096-byte block in DRAM 490 and updates the queue tail pointer and queue size in the queue 405a's queue descriptor memory entry to reflect the packet. At Step 706, queue manager 334 generates a request 600 (FIG. 6) to transfer the packet data from the internal packet memory 332 to queue 405a.

FIG. 6 is a schematic diagram of request 600 that can be used with the present invention. Request 600 comprises a command field 610, an address field 630, a transfer size field 650 and a queue identifier (QID) field 660. The command field 610 specifies the operation to be performed by the packet buffer 400, e.g., read or write data. The address field 630 specifies the location in the DRAM where the data is to be read or written. Preferably, this field is a 28-bit field that specifies a 32-byte block address. The transfer size field 650 specifies the amount of data to be transferred. Preferably, this field is a 7-bit field that specifies the number of 32-byte blocks to be transferred. The QID field 660 specifies the FIFO queue 405.

Returning to FIG. 7, traffic manager 330 generates request 600 specifying a write command in the command field 610, the address associated with the allocated block in the address field 630, the size of the packet in the transfer size field 650 and the QID for queue 405a in the QID field 660. Traffic manager 330 then sends request 600 along with the data to packet buffer 400, as indicated at Step 708.

Figure 8A:
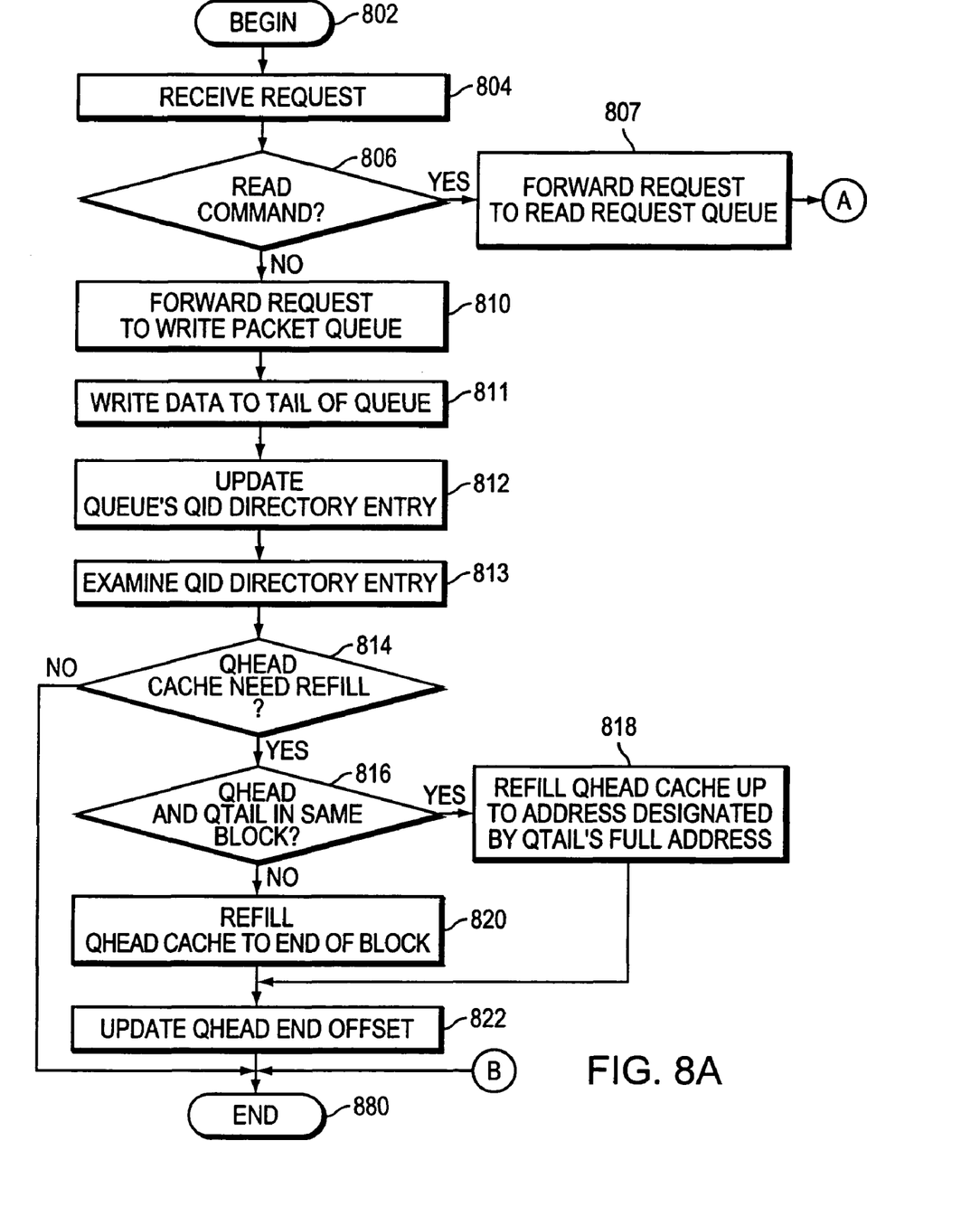
FIGS. 8A-B are a flow diagram of a sequence of steps that may be used to configure a packet buffer to operate in accordance with the present invention.
Figure 8B:
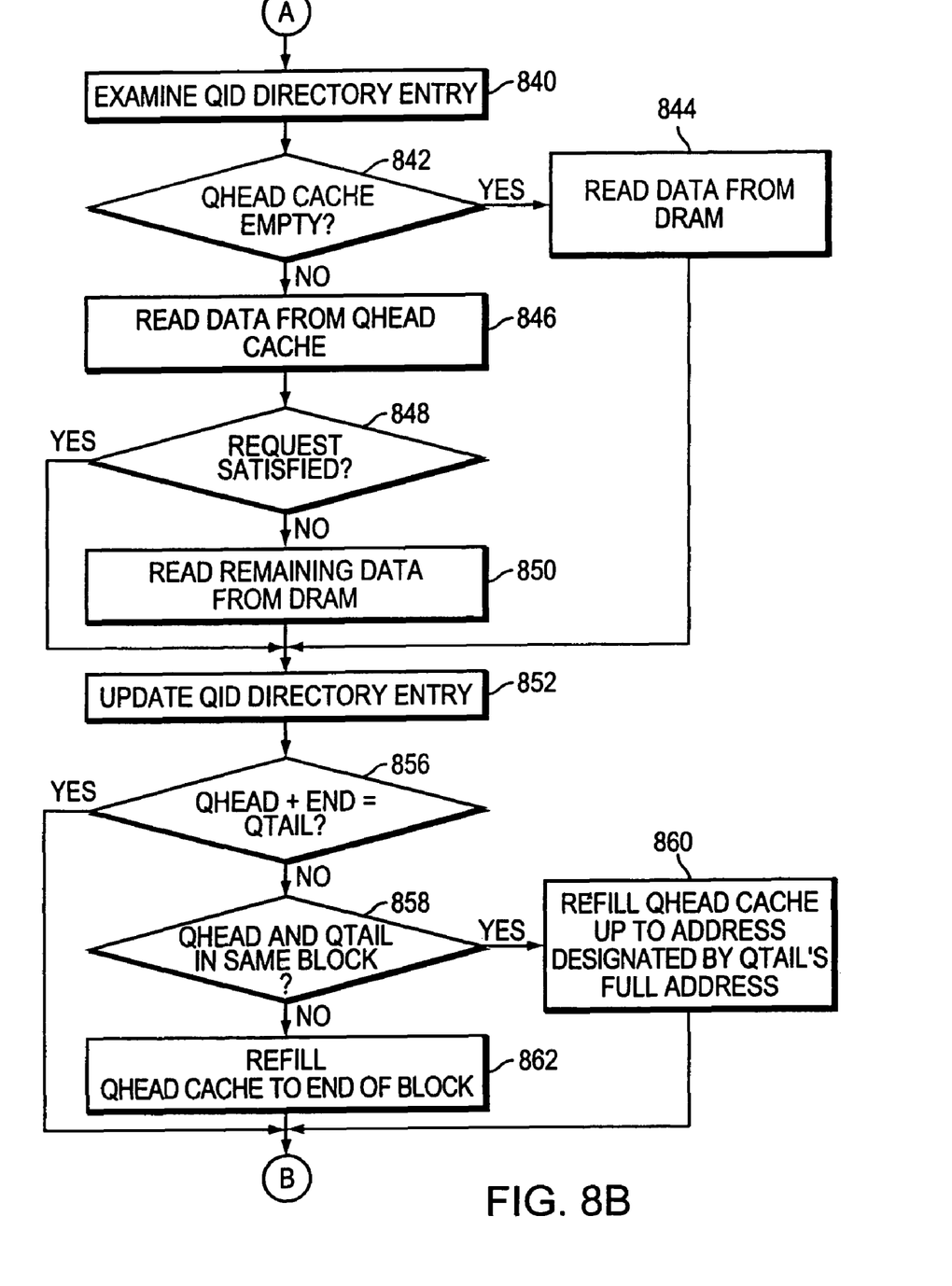

FIGS. 8A and 8B are flow diagrams illustrating a sequence of steps that enables a packet buffer, such as packet buffer 400, to be implemented as a high-speed, high-density packet buffer using high-speed and low-speed memory devices in accordance with the present invention. The sequence begins at Step 802 and progresses to Step 804 where request 600 and the associated data is received at interface logic 410 and transferred to the command decode logic 420. Next at Step 806, the command decode logic examines the command field 610 and determines if a read command is specified. As indicated above, command field 610 specifies a write command, so the sequence proceeds to Step 810 where the request including the data is transferred to the write packet queue 450 and the data is placed in the buffer 456.

At Step 811, the write packet queue 450 directs DRAM controller 470 to write the data associated with request 600 contained in buffer 456 into the low-speed portion 492a of queue 405a at the location specified by address 630. Next at Step 812, the write packet queue 450 updates the QID directory entry 500 for queue 405a to reflect the packet that has just been added to the queue 405a.

At Steps 813-814, write packet queue 450 examines queue 405a's QID directory entry 500 and determines if the high-speed portion of the cache (hereinafter "Qhead cache 482a") needs to be refilled. Specifically, the new entry field 520 is examined and if the field 520 indicates the queue 405a is enqueuing data for the first time, write packet queue 450 "concludes" that the cache 482a needs to be refilled, clears the new entry field 520 to indicate the queue is enqueuing data for the first time and proceeds to step 816. Otherwise, the difference between the Qhead end offset field 550 and Qhead start offset field 560 is calculated. If the difference is less than the size of cache 482a, i.e., 1024 bytes, the write packet queue 450 likewise concludes that cache 482a needs to be refilled and proceeds to step 816. Otherwise, cache 482a does not need to be refilled, i.e., the cache is full, and the sequence proceeds to Step 880 where the sequence ends.

If the new entry field indicates the queue is enqueuing data for the first time, the new entry field is cleared and the sequence proceeds to Step 816 where write packet queue 450 determines if the block address designated by Qhead block address 570 is the same as the block address designated by Qtail block address 540, i.e., queue 405a is contained in a single block. If the Qhead cache 482a is not contained in a single block, the sequence proceeds to Step 820 where the Qhead cache 482a is filled until either the cache 482a is full or the end of the block pointed to by Qhead block address 570 is reached. If queue 405a is contained in a single block, the sequence proceeds to Step 818 where cache 482a is refilled from the data contained in the low-speed portion 492a of the queue 405a until cache 482a is filled or the queue's tail address is reached. At Step 822, write packet queue 450 updates Qhead end offset 550 to reflect the amount of data placed in the Qhead cache 482a. The sequence then proceeds to Step 880 where the sequence ends.

Referring again to FIG. 7, at Step 712 queue manager 334 schedules the packet to be dequeued at some later time with scheduler 336. When scheduler 336 determines the packet is ready to be dequeued, it notifies the queue manager 334, as indicated at Step 714. The queue manager 334, at Step 716, then generates a request 600, in a manner as described above, to read the packet from the FIFO queue 405a. More specifically, queue manager 334 reads the entry associated with queue 405a from the queue descriptor memory 338 and, using this information, generates request 600 specifying a read command in the command field 610, the address of the head of the queue in the address field 630, the size of the packet, i.e., 2048 bytes, in the transfer size field 650 and the QID associated with queue 405a in the QID field 660. Request 600 is then sent to packet buffer 400, as indicated at Step 718.

At Step 720, the packet buffer 400 reads the data from queue 405a. More specifically, referring again to FIG. 8A, at Step 804 interface logic 410 receives request 600 and transfers the request to the command decode logic 420 where the request is examined to determine if the request specifies a read command, as indicated at Step 806. Since the request contains a read command, the sequence proceeds to Step 807 where the request is forwarded to the read request queue 430. The sequence then proceeds to Step 840 (FIG. 8B) where the read request queue 430 examines the QID directory entry 500 for queue 405a and determines if the Qhead cache 482a is empty, i.e., contains no data (Step 842). Preferably, this determination is made by calculating the difference between Qhead start offset 560 and Qhead block address 570 for queue 405a and, if the difference is zero, concluding the Qhead cache 482a is empty. If cache 482a is empty, the sequence proceeds to Step 844 where read request queue 430 directs the DRAM controller 470 to acquire (read) the packet from the low-speed portion 492a of the queue 405a and proceeds to Step 852.

As described above, cache 482a is not empty, so, the sequence proceeds to Step 846 where read request queue 430 directs the QID directory to acquire (read) the data from the Qhead cache 482a. Next at Step 848, read request queue 430 determines if all the data read from Qhead cache 482a is sufficient to satisfy the request, i.e., the amount of data read from the Qhead cache 482a equals the amount of data specified in the transfer size field 650 of the request 600. If so, the sequence proceeds to Step 852.

Since Qhead cache 482a provided only 1024 bytes of data which is less than the size specified in the transfer size field 650, the sequence proceeds to Step 850 where read request queue 430 directs the DRAM controller 470 to read the remaining data, i.e., 1024 bytes, from the low-speed portion 492a of FIFO queue 405a.

At Step 852, read request queue 430 updates the QID directory entry 500 associated with queue 405a by updating the Qhead start offset field 560 to reflect the amount of data that has been read from queue 405a.

Next at Step 856, read request queue 430 determines if there is data in FIFO queue 405a to refill the Qhead cache 482a. More specifically, read request queue 430 calculates the queue's head pointer by adding the Qhead block address 570 and the Qhead start offset 560, calculates the queue's tail pointer by adding the Qtail block address 540 and Qtail offset 530, and compares the head pointer to the tail pointer to determine if they are equal. If there is no data in the queue 405a, the sequence proceeds to Step 858 where a check is performed to determine if the Qhead block address 570 and Qtail block address 540 point to the same block. If so, read request queue 430 directs the QID directory 460 to direct the DRAM controller 470 to refill the Qhead cache 482a from the DRAM 490 until the cache 482a is full or the queue's tail address is reached, as indicated at Step 860. Otherwise if the Qhead block address 570 and the Qtail block address 540 are not in the same block, the DRAM controller is directed to refill cache 482a until the cache 482a is full or the end of the block is reached, as indicated at Step 862. The sequence then proceeds to Step 880 where the sequence ends. Since all of the data contained in queue 405a was read and the queue's head and tail pointers are equal, read request queue 430 concludes there is no data in queue 405a to refill cache 482a and thus proceeds to Step 880 where the sequence ends.

Referring once again to FIG. 7, at Step 722 queue manager 334 examines the queue's 405a entry in the queue descriptor memory 338 and determines that all of the data in the allocated block has been read, i.e., the block is no longer in use, and thus deallocates the block. The sequence then ends at Step 724.

Figure 9:
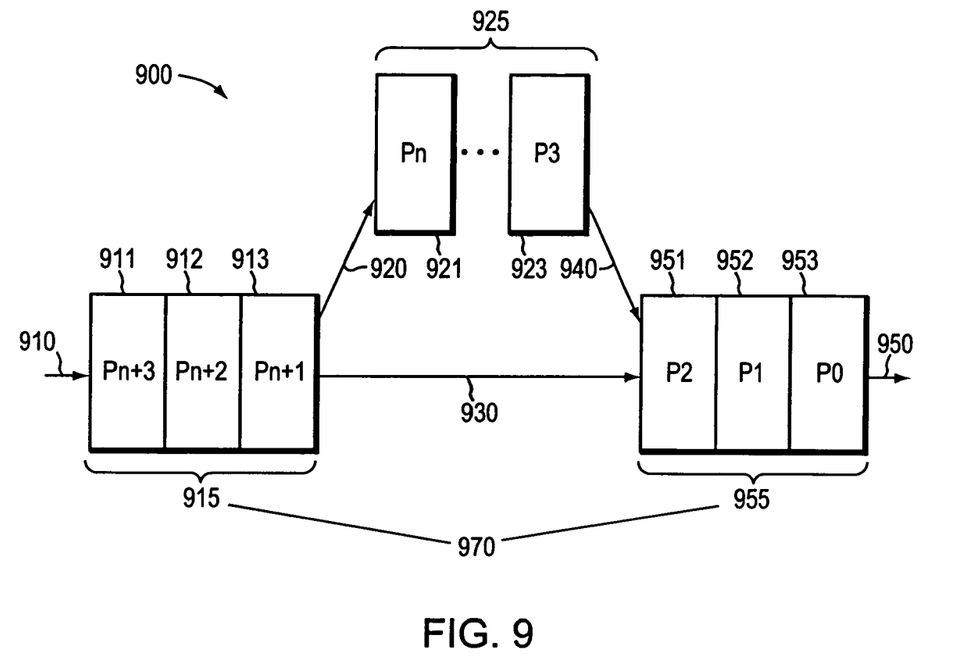
FIG. 9 is an illustration of an embodiment of the invention that employs a head cache and a tail cache.

It should be noted that in the above-described embodiment of the invention the high-speed portion of the FIFO queue comprises only a queue head cache; however, this is not a limitation of the invention. Rather, in other embodiments of the invention, the high-speed portion comprises other combinations of queue head and queue tail caches. For example, FIG. 9 is an illustration of a FIFO queue 900 that employs both a queue head cache and a queue tail cache. Queue 900 comprises a high-speed portion 970 comprising tail cache 915 and head cache 955, and a low-speed portion 925. The head cache 955 comprises entries 951, 952 and 953 and the tail cache comprises queue entries 911, 912 and 913. The low-speed portion comprises a plurality of entries including a first entry 923 and a last entry 921. Data enters FIFO queue 900 at 910 and is written to the tail cache 915. When the tail cache 915 becomes full, data is written to the low-speed portion 925 following path 920, in a manner as described above. Data is read from queue 900 also in a manner as described above first from the head cache 955, then from either the low-speed portion 925 following path 940, or the tail cache 915 following path 930 if the tail pointer of the head cache 955 equals the head pointer of the tail cache 915. Likewise, the head cache 955 is refilled, in a manner as described above, either from the low-speed portion 925 following path 940, or the tail cache 915 following path 930 if the tail pointer of the head cache 955 equals the head pointer of the tail cache 915.

It should be noted that certain methods employed by the above-described novel technique may be implemented in whole or in part using computer readable and executable instructions that are stored in a computer readable medium, such as DRAM, and executed on hardware containing processing elements capable of executing instructions, such as a processor. For example, in one embodiment of the invention, the methods performed by the traffic manager, the command decode logic, the read request queue, the write packet queue and the QID directory are implemented as a series of software routines that are stored in processor memory 360 and executed by processor 370.

In summary, the present invention incorporates a technique that enables the implementation of a high-speed high-density packet buffer without incurring the cost associated with wholly implementing the buffer using only high-speed memory devices. It will be apparent, however, that other variations and modifications may be made to the described embodiments, with the attainment of some or all of their advantages. Therefore, it is an object of the appended claims to cover all such variations and modifications as come within the true spirit and scope of the invention.

What is claimed is:

1. An intermediate node comprising:
    a packet buffer comprising one or more First-In-First-Out (FIFO) queues, wherein each FIFO queue is configured to hold one or more packets, and each FIFO queue comprises a high-speed portion and a low-speed portion, wherein the high-speed portion resides in high-speed memory and the low-speed portion resides in low-speed memory; and
    a traffic manager connected to the packet buffer and configured to enqueue and dequeue the one or more packets to and from the one or more FIFO queues, the traffic manager to enqueue the one or more packets directly to the low-speed portions of the one or more FIFO queues, without first storing the one or more packets in the high-speed portions of the one or more FIFO queues, and to dequeue the one or more packets from the high-speed portions of the one or more FIFO queues.

2. The intermediate node of claim 1 wherein the traffic manager further comprises:
    an internal packet memory configured to hold the one or more packets;
    a queue descriptor memory configured to hold information specific to each of the FIFO queues;
    a queue manager configured to manage the one or more FIFO queues; and
    a scheduler configured to determine when the one or more packets are dequeued from the one or more FIFO queues.

3. The intermediate node of claim 1 wherein each FIFO queue is further configured to be associated with a unique queue identifier (QID).

4. The intermediate node of claim 3 wherein the packet buffer is further configured to, in response to a request including a particular QID, enqueue or dequeue a packet to the FIFO queue associated with the particular QID.

5. The intermediate node of claim 4 wherein the request further comprises:
    a command configured to specify whether the request is a read request or a write request.

6. The intermediate node of claim 1 wherein the packet buffer further comprises:
    a queue identifier (QID) directory configured to refill the high-speed portion of each FIFO queue with packet data from the low-speed portion of the same FIFO queue.

7. The intermediate node of claim 6 wherein the QID directory further comprises:
    a database configured to hold a series of entries, each entry associated with a particular one of the one or more FIFO queues.

8. The intermediate node of claim 7 wherein each entry of the database comprises:
    a queue head pointer configured to indicate a head of the particular FIFO queue; and
    a queue tail pointer configured to indicate a tail of the particular FIFO queue.

9. The intermediate node of claim 8 wherein the queue head pointer comprises a queue head start offset and each entry of the database further comprises:
    a queue head end offset, wherein a difference between the queue head start offset and the queue head end offset of a particular FIFO queue is a number of units of data currently in the high-speed portion of that FIFO queue.

10. The intermediate node of claim 9 wherein the QID directory is configured to refill the high-speed portion if the number of units of data falls below a certain threshold.

11. The intermediate node of claim 1 wherein at least one of the one or more FIFO queues is a read queue.

12. The intermediate node of claim 1 wherein at least one of the one or more FIFO queues is a write queue.

13. A method for operating an intermediate node having a packet buffer with one or more First-In-First-Out (FIFO) queues, each FIFO queue having a high-speed portion and a low-speed portion, the method comprising the steps of:
    issuing a request to the packet buffer, the request including a queue identifier (QID) and a command field;
    in response to the command field indicating that the request is a read request,
        acquiring packet data from a high-speed portion of a particular one of the one or more FIFO queues that is associated with the QID, if the packet data is available in the high-speed portion, wherein the high-speed portion resides in high-speed memory and
        acquiring the packet data from a low-speed portion of the particular FIFO queue, if the packet data is unavailable in the high-speed portion, wherein the low-speed portion resides in low-speed memory; and
    subsequent to the acquiring, refilling the high-speed portion of the particular FIFO queue with packet data from the low-speed portion of the particular FIFO queue.

14. The method of claim 13 further comprising the step of:
    accessing a database configured to hold a series of entries, each entry associated with one of the one or more FIFO queues, each entry including a head pointer and a queue head end offset; and
    calculating a number of units of data currently in the high-speed portion of the particular FIFO queue in response to the queue head pointer and the queue head end offset of the particular FIFO queue.

15. The method of claim 14 wherein the queue head pointer comprises a queue head start offset and the step of calculating the number of units further comprises:
    determining the difference between the queue head start offset and the queue head end offset.

16. The method of claim 14 wherein the step of refilling is in response to the number of units of data falling below a certain threshold.

17. A method for operating an intermediate node having a packet buffer with one or more First-In-First-Out (FIFO) queues, each FIFO queue having a high-speed portion and a low-speed portion, the method comprising the steps of:

issuing a request to the packet buffer including a queue identifier (QID) and a command field;

in response to the command field indicating the request is a write request, writing packet data directly to a low-speed portion of a particular one of the one or more FIFO queues that is associated with the QID, without first storing the packet data in a high-speed portion of the particular FIFO queue, wherein the low-speed portion resides in low-speed memory and the high-speed portion resides in high-speed memory;

subsequent to the step of writing, moving the packet data from the low-speed portion to the high-speed portion of the particular FIFO queue, to refill the high-speed portion; and providing the packet data from the high-speed portion of the particular FIFO queue.

18. A computer readable medium containing executable program instructions for operating an intermediate node, the executable program instructions comprising program instructions adapted to:

issue a request to a packet buffer, the request including a queue identifier (QID) and a command field;

in response to the command field indicating the request is a read request, acquire packet data from a high-speed portion of a particular First-In-First-Out (FIFO) queue that is associated with the QID, if the packet data is available in the high-speed portion, wherein the high-speed portion resides in high-speed memory, and acquire the packet data from a low-speed portion of the particular FIFO queue, if the packet data is unavailable in the high-speed portion, wherein the low-speed portion resides in low-speed memory; and refill the high-speed portion of the particular FIFO queue with packet data from the low-speed portion of the particular FIFO queue.

19. The method of claim 17 further comprising:

accessing a database configured to hold a series of entries, each entry associated with one or more FIFO queues, each entry including a head pointer and a queue head end offset; and calculating a number of units of data currently in the high-speed portion of the particular FIFO queue in response to the queue head pointer and the queue head end offset of the particular FIFO queue.

20. The method of claim 19 wherein the queue head pointer comprises a queue head start offset and the step of calculating the number of units further comprises:

determining the difference between the queue head start offset and the queue head end offset.

21. The method of claim 19 wherein the step of moving is in response to a number of units of data falling below a certain threshold.

* * * * *